United States Patent Office 3,462,610
Patented Aug. 19, 1969

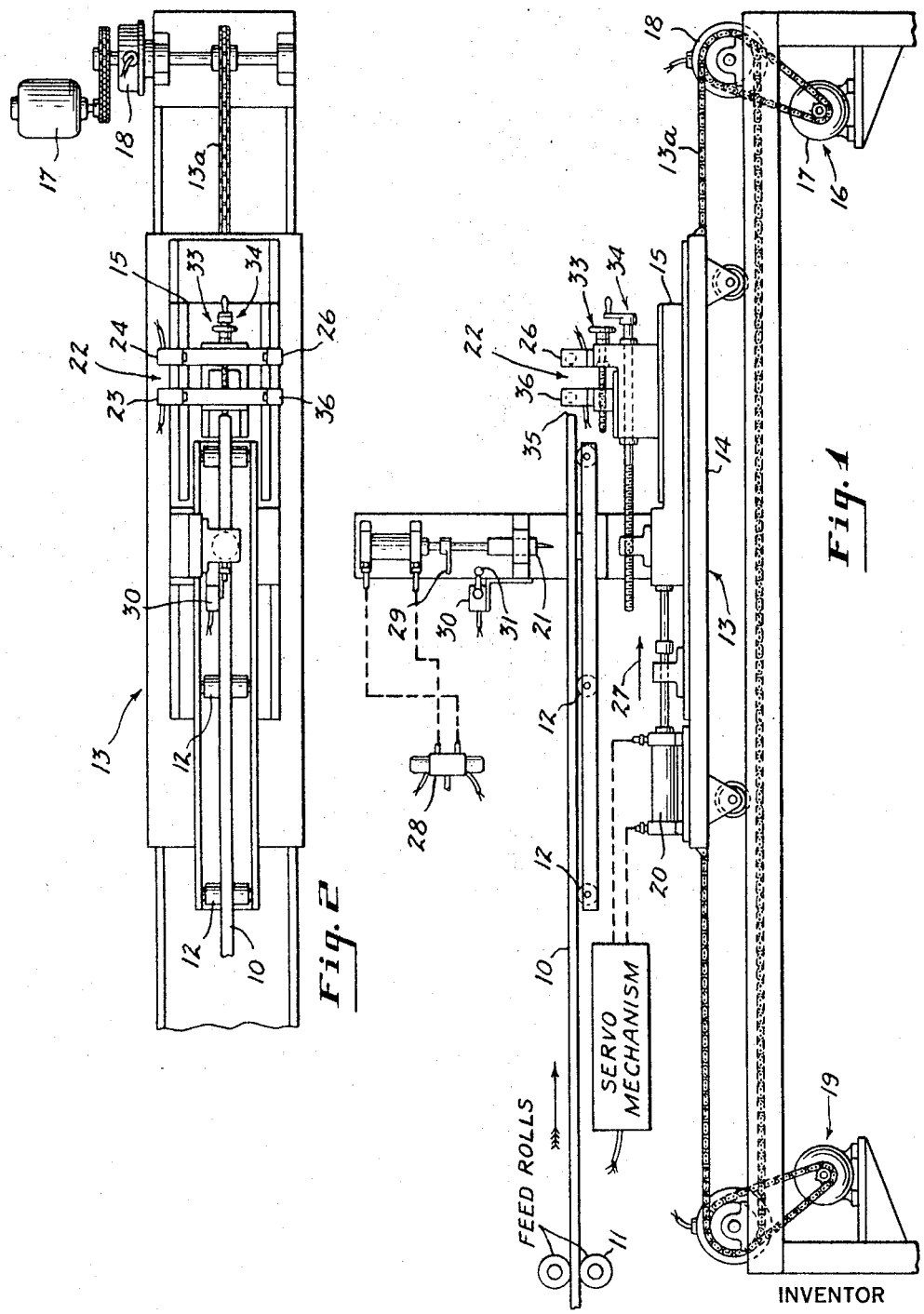

3,462,610
PHOTOELECTRIC METHOD AND APPARATUS
FOR LOCATING A WORKPIECE
Edmund C. Frost, 30650 Pine Tree Road,
Cleveland, Ohio 44124
Continuation of application Ser. No. 355,867, Mar. 30,
1964. This application Dec. 29, 1966, Ser. No. 622,835
Int. Cl. G01d 5/34
U.S. Cl. 250—219                28 Claims

ABSTRACT OF THE DISCLOSURE

Methods and apparatus for operating on a particular portion of a workpiece, such as a continuous metal strip, moving continually relative to the apparatus, comprising a workpiece operator, such as a metal strip cutter, a carriage for supporting the workpiece operator so that the carriage moves back and forth along the path of the continuously moving strip, the workpiece operator supported on the carriage to move back and forth on the carriage along the path of the strip; first and second monitoring means, such as a photoelectric sensors mounted on the workpiece operator, the first of such monitoring means set to trigger a first drive mechanism imparting motion to first carriage in the direction of and roughly corresponding to the velocity of workpiece movement upon sensing passage of the lead edge of said workpiece past said first monitoring means, and the second of such monitoring means set to trigger a second drive mechanism imparting motion to the workpiece operator back and forth along the first carriage at a rate of speed roughly equivalent to the differential between the speed of the first carriage and the workpiece, such second monitoring means providing a signal which varies continuously in response to the position of the lead edge of the workpiece from such second monitoring means, so that the mechanism driving the workpiece operator along the carriage causes the workpiece operator to advance and retreat along the path of the workpiece at varying rates of speed tending to center the workpiece operator at a preselected position relative to the workpiece and at a speed which substantially exactly equals the differential between the speeds of the carriage and the workpiece so that precision operations may be performed without halting the workpiece.

---

This application is a continuation of my copending United States patent application Ser. No. 355,867, filed Mar. 30, 1964, now abandoned. This invention relates generally to methods and apparatus for operating upon a relatively moving workpiece and particularly to such operation wherein it is necessary or desirable to maintain a workpiece operator and a workpiece in a temporarily substantially stationary relation during such operation but where it is also necessary or desirable to maintain the workpiece and the apparatus mounting the workpiece operator in continual motion relative to each other during such operation as, for example, in assembly line operations, and especially where such operation must be carried out with a high degree of precision at high speeds. More particularly, the present invention relates to methods and apparatus for controlling a workpiece operator movable with respect to a relatively moving workpiece, the control being by means of a speed monitor operable to feed a signal which varies continuously as a function of the distance of the speed monitor from a particular point on the workpiece to a mechanism for imparting motion to the workpiece operator responsive to and at a velocity which is a function of the amplitude of the signal, so that the motion of the workpiece operator tends to stabilize at a rate and in a direction substantially matching the motion of the workpiece.

The present invention has wide application to high speed mass production and high speed processing techniques in various arts as will be apparent to persons of skill in the particular art. Numerous examples of these applications are listed near the end of the present specification. For purposes of illustrating my invention, I have selected an embodiment for mass production of lengths of a material cut from a continually moving strip of material, where the lengths are cut with in a close tolerances, and wherein it is desirable to cut the strip of material while it is moving at maximum speed. In order to do this, it is desirable to have the instrument doing the cutting moving at the same velocity as the strip to be cut, so that the length of the piece to be cut can be controlled with precision, and yet not requiring the strip to be slowed down or halted for cutting operation. A problem in achieving this desired result is in the maintenance of the speed of the cutter relative to the strip. Prior attempts in this art have introduced an error in maintaining such speed due to the time lag between the time the signal was given to cut, and the actual cutting. This error is caused by differing speeds of activating by the mechanism from time to time and varying speeds in the strip. Under the present invention, these problems are substantially eleminated by providing means, comprising one object of the invention, for initiating a cutting cycle in response to precision adjustment of the instrument doing the cutting to match the speed of the strip when the cutting instrument or workpiece operator is at a predetermined distance from the lead edge of the strip.

In using the above cutting system and other systems within the present invention for precision operations, although the workpiece moves at a relatively constant velocity, it is desirable to have a accurate and continual monitoring of its velocity so that the speed of the workpiece operator may be corrected for small changes in the velocity of the workpiece. Accordingly, it is a further object of this invention to provide means monitoring the velocity of the moving workpiece in an exact length cutoff system or the like with a photocell having a conduction versus light incidence characteristic curve with a substantially linear portion, utilizing a servo loop to match the velocity of the workpiece operator to the velocity of the workpiece, and utilizing a preselected spot on said curve as the spot at which no further correction by the servo loop is necessary. Lesser or greater light incidence on the cell creating a conductance of a lower or higher position on the curve instantly signals a correction factor into the servo loop, serving to change the position of the cell and light sources relative to the end or other preselected spot on the strip or other workpiece. This change dampens towards a conductance of the cell within predetermined limits of the preselected point on the curve beyond which no further correction is desired.

This invention is further directed towards the utilization of a nonhunting or antihunting servomechanism in monitoring the speed of the workpiece where the servo loop would consist of, in addition to a monitoring photocell having a continuous signal output with a preselected point on the conduction versus light incidence curve towards which the servo system should dampen, an amplifier and a hydraulic or fast response electric motor unit responsive to a signal from said amplifier. It has been found desirable that any servo mechanism within said system be limited from oscillating about any desired operating point on the curve, or if there is such oscillation, to provide damping factors on it towards quickly settling down to a stable position at the desired operating point. This feature is referred to in the literature as "antihunting."

This invention is further directed to a desirable feature for high speed operations to adjust the speed of the workpiece operator to the speed of the workpiece in two or more stages. This may be done, for example, by providing a first carriage for motion at a fixed velocity approximately equal to the speed to the workpiece, a second carriage mounted on the first carriage for motion within a continuous range of velocities relative to the first carriage, means sensing the passage of the workpiece to initiate operation of the first carriage, and means sensing the velocity of the workpiece to initiate operation of the second carriage to attain a velocity such that $V_1+V_2=V_w$, where $V_1$=velocity of the first carriage, $V_2$=velocity of the second carriage, and $V_w$=velocity of the workpiece. $V_1$ is preferably large in comparison to $V_2$, thus permitting fast and sensitive adjustment in the velocity of the workpiece operator to allow for small variations in $V_w$. This multistage system is preferable for high speed operations. Accordingly, it is a still further object of this invention to provide a dual carriage system with a servomechanism embodying monitoring means such as photocells spaced at a distance and being responsive to the passage of a continuing moving workpiece past light beamed at said photocells, calibration of the signals provided by said photocells to said distance between said photocells. Each of said photocells mounted on carriages movable with respect to said workpiece and with respect to each other, the first one of said photocells having bistable response to the passage of said continuously moving workpiece, time delay means delaying the signal from said bistable photocell, one of said carriages mounting the second of said photocells and carrying an instrument for operation on said workpiece (such as for example for cutting the workpiece into desired lengths) responsive to the signal from said time delay means, means providing additional acceleration to said one carriage relative to the other responsive to a signal from the second of said photocells, and means responsive to said time delay means for returning the carriage carrying said workpiece operator to an original rest position. It is a still further object of this invention to provide a system for operating upon a moving workpiece with photocells and amplifiers and bistable switching elements having components of semiconducting and transistor types in order to provide the simplicity of design and fast response time for operating on said workpiece, the response being several orders of magnitude time less than the time required for a desired length of said moving workpiece to pass by a point in the path of said workpiece.

It is still a further object of this invention to provide a system for operating upon a moving workpiece with means for detecting the speed of a moving workpiece with photocells of cadmium sulfide, cadmium selenide, silicon or selenium variety, said photocells having a response time in terms of an electrical signal response to light incidence characteristic being several orders of magnitude less than the time required for a predetermined length of said continuously moving workpiece to pass by a point in the path of said workpiece.

It is a still further object of this invention to provide apparatus for performing an operation on a continually moving workpiece, the apparatus comprising a pair of workpiece motion monitoring means, a movable carriage mounting a workpiece operator and one of the monitoring means, said one monitoring means giving a continuously varying signal, the signal varying with proximity of the end of the workpiece to the monitoring means and conditioned for operation by comparing the said signal with a predetermined calibration of such proximity, and means mounted on said other of said carriages for applying additional acceleration to the aforementioned one of said carriages carrying the operator responsive to a time delay to and by a signal from the monitoring means initiating the continuous signal, and means accelerating the other of said carriages responsive to the other monitoring means, and means restoring said carriages to an initial rest position responsive to a time delay initiated by the monitoring means generating the continuous signal.

These and other objects of this invention will be more clearly understood from the following drawings and specification in which like numerals refer to like parts and, wherein:

FIGURE 1 is a side view of an embodiment of this invention for cutting a continuously moving strip of material into desired lengths that are predetermined with relatively close tolerances wherein the mechanical features of the apparatus are shown;

FIGURE 2 is a plan view of a portion of the apparatus shown in FIGURE 1;

Figure 3:
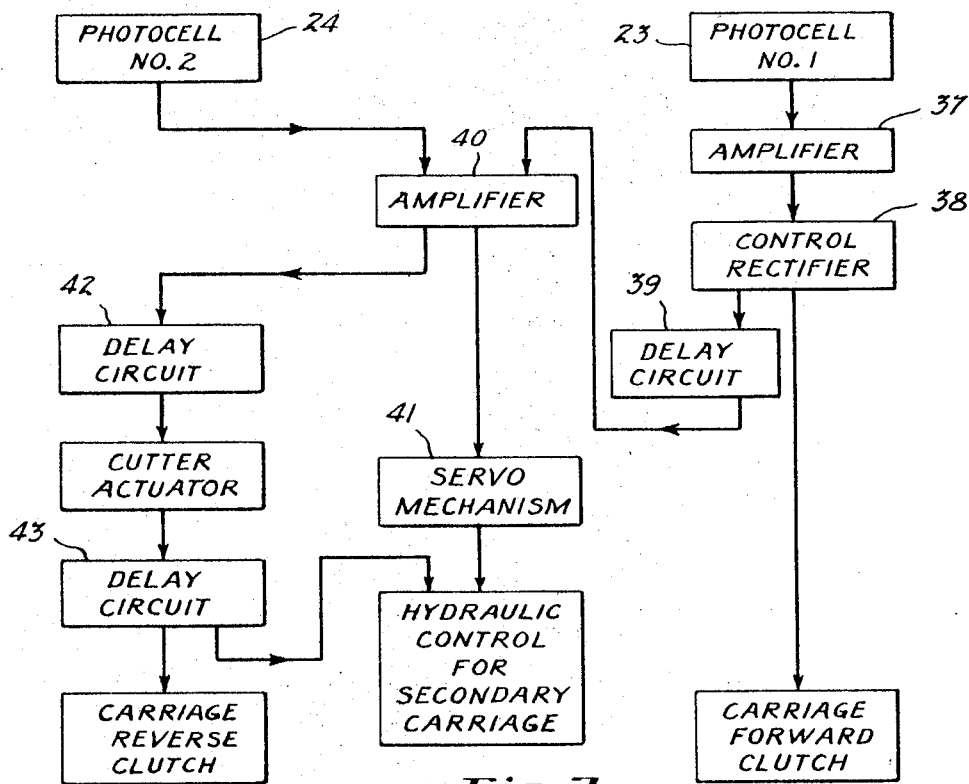
FIGURE 3 is a flow chart showing the relationship between control components of the apparatus shown in FIGURE 1.

Referring in greater detail to FIGURE 1, there is shown a strip of material 10 moving at a relatively constant speed over rollers 11 and 12. In parallel adjacent relationship to the path of the strip 10 there is shown a cutter carriage and platform assembly 13. Broadly speaking, this platform and carriage assembly comprises two carriages, carriages 14 and 15, that are movable with respect to each other in a path parallel to the path of the strip, and both being movable in a path parallel to the strip with respect to the moving strip itself. Carriage 15 is mounted on carriage 14.

Carriage 14 is driven in the direction of the strip by engagement of the carriage to a power drive shown generally as numeral 16. The power drive 16 comprises a motor 17 and motor control 18. The motor control is preferably a rapidly actuatable means of transmitting power such as a magnetic clutch. The carriage 14 is operable to be driven in a direction opposite to that of the continuously moving strip by a power drive 19. Power drive 19 is substantially similar to power drive 16.

Carriage 15 is operable to be driven in a direction parallel to the path of motion of the strip 10 and relative to the carriage 14 responsive to the actuation of a hydraulic drive mechanism shown at numeral 20.

Fixedly mounted to the carriage 15 is an instrument for performing an operation on a continuously moving strip 10, being in the present embodiment of this invention a cutter preferably of the guillotine type shown generally at numeral 21 in FIGURE 1. There is also mounted on carriage 15 a monitoring system 22 which consists of at least 2 monitoring members 23 and 24, being in the preferred embodiment of this invention a pair of photocells with attendant electrical signal amplifying means, electrical signal time delay means, and electrically responsive servomechanism loop.

In the preferred embodiment of this invention the photocell 23 is preferably of the silicon type, having a relatively large electrical conductance response to change in light incidence within a relatively short period of time and being perferably in the millisecond range or in that order of magnitude for a change of conductance of 1000% or more before dark and against two candlepower. The second photocell is also preferably of a similar cadmium sulfide, cadmium selenide silicon or selenium variety, for example a cadmium selenide cell such as model C1603/A produced by the Clairex Manufacturing Corporation. The second cell, rather than being electrically biased for bistable response, as is the first cell, is electrically biased to give a continuously varying signal to its amplifier, and being biased for operation at a point 25 on its conductance to light curve shown in FIGURE 4.

The amplifier to which the electrical signal from the first photocell is fed, is, in the preferred embodiment of this invention, an amplifier such as the Farmer Electric Products Company TR3A or similar amplifier as is well known in the art, and carrying the modification of having an output from a silicon control rectifier such as is well known in the art. The amplifier to which the signal is fed from the second photocell is part of a system including a servo mechanism controlled solenoid and hydraulic system with valve actuator responsive to the solenoid, such a combination being well known practitioners in the art of systems utilizing photocell response amplification input to servo mechanism controlling hydraulic gear.

In an alternative embodiment of the present invention, the second cell may be one having two parallel conducting paths from a source of electrical signal of iridium such as the Clairex CL603/2 cadmium selenide cell. In the following description of the biasing of the cell, the figures are relative, and may be varied by as much as several multiples without departing from the scope of this invention.

In the practice of applicants' invention, the second cell, as the first cell, may be responsive to an incandescent bulb shown as numeral 26 in FIGURE 1, such bulb giving a spectral peaking toward the red end of the light spectrum, with a candlepower of about 5 and derated to a lower voltage so as to give a resultant light output on the order of 3.4 candlepowers for longer life. The cadmium selenide cell such as the CL603/2 at a distance of 4 inches or thereabouts in the alternate embodiment of this invention will then be responsive at full power from the light source of approximately 30 foot-candles. At 30 foot-candles the cell will have a resistance of approximately 18,000 ohms. This resistance is measured after a typical light history of being exposed several hours to normal light in the range between 5 and 30 candlepowers. The cadmium selenide or cadmium sulfide cells peak in their response to light incidence between 6,000 and 7,000 Angstroms. At this choice of illumination, there is a response time from, in terms of conductance to light incidence, approximately 10 megohms down to approximately 100,000 ohms in a lapse of approximately 1 to 3 milliseconds of time.

Figure 4:
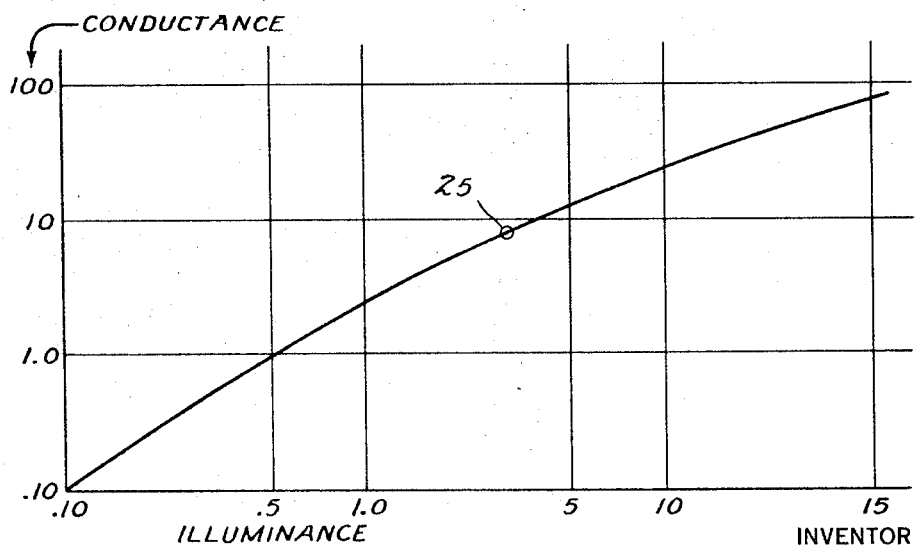
FIGURE 4 is a portion of the illuminance to conductance characteristic of photocells used in the speed monitoring components.

In the practice of this invention for precision operations at high speeds it is highly desirable that any photocells used exhibit the following properties:

(1) Fast response to change of illuminance i.e., a change of order of magnitude of conductance to a corresponding change of order of magnitude of illuminance within a lapse of time less than or equal to a range of one to three milliseconds;

(2) A conductance to illuminance characteristic such as the mhos to candlepower curve portion shown in FIGURE 4 for the aforementioned Clairex CL603/A having a substantially linear portion such as that proximate point 25 where there is a substantial rate of change of conductance to illuminance;

(3) The photocell exhibits a substantially stable change in conductance per change in illuminance over a substantial portion of its operating life.

It is also necessary where photocells are employed in the practice of this invention, that the point at which photocell 24 generates a signal corresponding to the change of polarity of acceleration induced by such signal in the servomechanism, as discussed infra, correspond to a point on a portion of the conductance to illuminance characteristic that is substantially linear and exhibits a substantial rate of change of conductance to illuminance, such as that portion of the curve shown in FIGURE 4 proximate to point 25 for the Clairex CL603/A photocell.

In an alternative embodiment of this invention utilizing a photocell having dual conducting paths such as the Clairex CL603/2, when one side of the cell is relatively darker than the other, a positive voltage is arranged between 10 and 100 volts at a given current level. When the opposite side is relatively dark with respect to the formerly dark side, a voltage approximately equal to and opposite to in phase is observed. Thus, a desired operating point such as the point 25 shown in FIGURE 4 could be chosen at a datum level of zero voltage on either side of which would have opposite polarity to the other.

In a preferred embodiment of this invention, the photocell 24 is a cadmium sulfide or cadmium selenide type of photocell such as the CL603/A produced by Clairex. The operating point 25 on the characteristic conductance to incidence curve is chosen such that a conductance below the operating point will excite a response from the photocell to the amplifying means and servoloop such as to produce a positive acceleration on the second carriage from the hydraulic drive mechanism shown generally at arrow 27 in FIGURE 1. When the conductance due to a different illumination is such that the operating point of the photocell is above the desired point 25 on the curve shown in FIGURE 4, the resultant amplified signal sent to the servo mechanism controlling the hydraulic drive mechanism induces a negative acceleration provided by the hydraulic drive mechanism 20, opposite to the drive indicated at numeral 27.

The cutter 21 is actuated by a solenoid 28 to move in a downward direction, cutting the strip off in response to a signal applied to the solenoid 28. After the cutter 21 is actuated downwardly to cut the moving strip 10, a portion 29 of the cutter mechanism trips a bistable device 30 into a different stable condition. In the preferred embodiment of this invention, the bistable device 30 may comprise a combination of a light source and photocell responsive to portion 29 intervening therebetween so as to produce a change in illumination and, therefore, a change in electrical signal. In an alternative embodiment, the bistable device may comprise a limit switch having a lever 31 movable by the portion 29 of the cutter mechanism so as to change the state of a limit switch. In either the preferred embodiment or the alternative embodiment with respect to the bistable device 30, a change in state of such a device will produce an electrical signal to the solenoid 28 which will actuate that solenoid to raise the cutter member to its initial rest position.

Means are indicated generally at 33 and 34 respectively for changing the relative positions of the monitoring means 23 with respect to monitoring means 24 and the monitoring unit as a whole 22 with respect to a point of engagement of the cutter 21, respectively. Thus, the invention may be applied to processing a continuous strip of material where the desired length to be cut is changed from time to time, and the desired constant level of velocity of the strip may be desired to be changed from time to time.

In the operation of this invention in its preferred embodiment, when end 35 of strip 10 approaches the path of light between source of light 36 and photocell 23, the operation cycle begins. At the initiation of the operational cycle, the strip 10 is moving at a relatively constant velocity. The motors of drive means 16 and 19 are turning, but their respective magnetic clutches, such as the magnetic clutch 18, are not engaged. Thus, carriages 14 and 15 are static with respect to the motion of the strip 10. In addition, the servomechanism is in a quiescent condition, and the hydraulic drive mechanism 20 is in a static condition, so that carriage 15 is static with respect to the carriage 14.

As end 35 moves past the path of light between photocell 23 and source 36, the amount of light incident on cell 23 is reduced to a point where the relative conductance of cell 23 is substantially changed and this condition is reflected through amplifier 37 so that the bistable condition of the control rectifier 38 undergoes a change of state. The resultant electrical signal is fed to the carriage forward clutch, being preferably the magnetic clutch 18. Thus, power from motor 17 is applied through flexible link 13a or other appropriate drive transmission means, so as to provide motion to carriage 14 in the direction of the moving strip 10.

The resultant signal from the control rectifier is also fed to a delay circuit 39 which may be an R–C circuit or other appropriate means including other charging or discharging types of circuits to provide a delay in the output signal of this delay circuit. The output from this delay circuit is then fed to an amplifier 40 having a gate conditioned for sending a positive signal to the next amplifier stage, dependent on receiving signal from delay circuit 39 and thus conditioning the amplifier 40 for amplifying signal from photocell number 2, indicated at numeral 24. The delay provided by delay circuit 39 results in a time delay approximately equal to the time required for the end of strip 35 to travel from the path between photocell 23 and source 36 to the path between photocell 24 and source 26. At this point in time, amplifier 40 is now conditioned for operation and receives electrical signals from photocell number 2. In the preferred embodiment of this invention, at this particular instant of time in the operational cycle of the device, the drive means 16 has provided sufficient acceleration to carriage 15 so that its velocity is approximately equal to the velocity of the continuously moving strip, preferably being as close to that speed as possible. In practice, it is anticipated that the speed may be off as much as $\frac{1}{10}$ of a percent to 1 percent of the speed of the strip. This error is due both to slight variances to the speed of the motor utilized as well as variations in the speed of the strip.

Photocell 24, also being referred to as photocell #2, is continuously feeding a signal to amplifier 40, the signal varying with the light intensity incident to photocell #2. When end 35 of strip 10 approaches the path of light between source 26 and photocell 24, the amount of light incident to photocell #2 will be dependent upon the relative position of end 35 with respect to the path from source 26. If end 35 is considerably past the path between cell 24 and source 26, a relatively small amount of illumination will be incident upon cell 24. On the other hand, if the end 35 of strip 10 is at a considerable distance from approaching the path of light between source 26 and cell 24, the amount of illumination incident upon cell 24 will be relatively large. Thus, the degree of illumination incident upon cell 24 will be reflective of the relative position between that cell and the end 35 of strip 10 and will also be reflective of whether or not end 35 has blocked half the path of light between source 26 and cell 24. The desired operating point 25 indicated on FIGURE 4 is chosen to be that point at which end 35 is positioned with respect to the path of light between cell 24 and source 26 such that the distance between end 35 and the point of engagement of cutter 21 with strip 10 is within the tolerances desired of the desired length of strip 10 to be cut. The difference between the conductance at this chosen point 25 and the actual conductance valve will be reflected, positively or negatively, dependent upon the relative position of end 35, and will be fed through amplifier 40 and amplified by amplifier 40 when that amplifier has been conditioned for operation by the aforementioned signal by delay circuit 39. The output of amplifier 40 will be fed to servomechanism 41, which in turn will feed a signal to the control for actuating the hydraulic drive mechanism 20. The amplitude of the signal of the amplifier 40 will be dependent on its input from photocell 24. The amount of this amplitude will in turn control the amount of acceleration induced by the hydraulic drive mechanism 20. As the amplitude from amplifier 40, is decreased, the amount acceleration is decreased. When the signal from amplifier 40 changes in polarity, so does the resultant acceleration provided by the hydraulic drive mechanism 20. Thus, a continuous control is provided to the hydraulic drive mechanism 20, which continually varies the acceleration provided to carriage 15 with respect to carriage 14.

Referring to FIGURE 4, it can be seen that by choosing the operating point 25, that is the point at which the polarity of the signal from the photocell will be biased to change, and thus the acceleration biased to change in polarity, as strip 35 comes closer and closer to causing the signal from photocell 24 to approach operating point 25, the degree of acceleration or deceleration applied to carriage 15 by hydraulic drive mechanism 20 is reduced in magnitude, so that the tendency for the servoloop to oscillate back and forth relative to the operating point 25 is substantially limited, if not entirely eliminated and is heavily damped. Thus, the acceleration provided by the hydraulic drive mechanism on carriage 15 is quickly reduced to zero, so that an asymptotic velocity of carriage 15 with respect to carriage 14 is quickly arrived at and substantially maintained.

When the signal from amplifier 40 approaches a datum level corresponding to illuminance of photo cell #2 at the operating point 25, a signal is fed to delay circuit 42. Delay circuit 42 is substantially similar to delay circuit 39, being a reactive-resistance circuit having an inherent transient delay response. The output from delay circuit 42 is then fed to the cutter actuator, being the solenoid 28, and is returned to another delay circuit 43, being the same type of delay circuit as delay circuit 42. The resultant output of delay circuit 43 is then fed to the control for the hydraulic drive mechanism, to return same to its initial rest position. At the same time, the signal from delay circuit 43 is fed to the carriage reverse clutch of drive mechanism 19 for engaging the motor of that drive to returning carriage 14 to its initial rest position, thus completing the operational cycle.

The delay provided by delay circuit 42 is sufficient to allow the servo mechanism 41 to reach a quiescent state corresponding to point 25 and allow for the damping of any possible oscillations before initiating the cutter actuator. The delay provided by delay circuit 43 provides sufficient delay to allow the cutter to cut the strip and return to its initial rest position before carriages 14 and 15 are reurned to their initial rest positions prior to beginning another operational cycle.

The foregoing description discloses basically a single limited embodiment of the present invention. Other embodiments are contemplated and are within the present invention. For example, the workpiece operator may comprise apparatus for marking, welding, drilling, analysis, inspection, photographing, applying tapes or connectors, inserting nails, screws, bolts, pins, etc., forming, punching holes, threading, assembling parts, splicing, collecting data, grinding, polishing, paintaing, heating, cooling, trimming, processing food, measuring speed, dimension, weight, position, and many other operations too numerous to mention where it is desirable that the workpiece be continually moving relative to apparatus carrying the workpiece operator, but where it is desirable to have a monitoring of the position of the workpiece relative to the workpiece operator during operation.

It is further to be noted that the present invention contemplates that apparatus carrying the workpiece operator would be moving and the workpiece itself be stationary as for example in apparaatus for operating upon installed railroad ties where the apparatus would be carried upon a car riding the railroad tracks, or in similar embodiments for working upon highways, cultivating farm crops, or the like.

A particular embodiment of the present invention may provide for lateral measurement of a workpiece wherein the workpiece operator comprises a lateral track spaced from and supported generally above the workpiece, such track supporting a wheel coupled to a tachometer, the wheel traversing the track transversely to the direction of workpiece motion during such time as the workpiece operator support and workpiece are temporarily substantially stationary according to the present invention, and means for recording the tachometer readings responsive to a signal from a reflective photoelectric cell carried by the wheel so that the reflective photocell senses the lateral edge of the workpiece as the wheel and photocell pass above it and signals recording of the tachometer readings until such time as the wheel and photocell pass over the opposite edge of the workpiece whereupon recording ceases.

A further particular embodiment comprising the combination of any workpiece operator consisting of a reading device, such as the above lateral measurement apparatus, or other inspection means with analog or digital computer means for recording to utilize the data obtained for various purposes including for quality control, inventory control, safety, etc., as will be apparent to persons of skill in the particular arts to which such embodiments have application.

A further embodiment within the scope of the present invention comprises the alternate utilization of two or more workpiece operators each with the locating mechanism of the present invention such that, as would be desirable for high speed operations, one operator could be functioning while another is returning to rest position after having completed one operational cycle, or where several operators function simultaneously, each at a different phase in the cycle of operation, the particular design of such embodiments being readily apparent to persons of ordinary mechanical skill having knowledge of the present invention.

It should be noted that the present invention is not limited to any particular monitoring means, but contemplates, in addition to photocells, other means for regulating the input to means for imparting motion to a workpiece including levers, traction wheels, eddy current proximity devices and the like coupled to an on-off switch where bistable response is required, and coupled to variable current means such as rheostats or solenoids of suitable design where a continuously variable signal is required.

It should also be noted that it is not necessary to employ delay circuitry in the various stages of operation. Instead, for example, it is within the contemplation of the present invention that operation of means imparting motion to the variable speed carriage be responsive to the fact of the constant speed carriage reaching its operational speed. Or, as a further example, operation of the workpiece operator may be responsive to the fact that the workpiece operator and workpiece have stabilized in substantially stationary relation, such fact being sensed by any suitable mechanism of the sort which will be apparent to persons of ordinary mechanical skill.

Further, whereas the strip cutting apparatus described in detail above employs photoelectric cells to sense the passage of the lead edge thereby, the present invention contemplates utilization of other reference points in addition to the lead edge of the workpiece, as for example, relatively reflective or nonreflective areas on the workpiece where the monitoring means comprise a reflective photoelectric cell, or protuberant portions on the workpiece where the monitoring means comprise a lever or the like for engagement therewith.

I claim:

1. Apparatus for operating on a particular portion of a workpiece moving relative to said apparatus comprising
a workpiece operator movable in the direction of motion of said workpiece;
first means operable to impart a continuously variable rate of motion to said workpiece operator;
monitoring means operable to provide a continuously variable signal, said signal variable as a function of the distance of said monitoring means from said particular portion of said workpiece, said monitoring means mounted at a fixed predetermined position relative to said workpiece operator so that said workpiece operator is aligned for operation on said particular portion of said workpiece during operation of said operator;
second means conditioning said first means for operation responsive to and as a function of the signal from said monitoring means so that said first means operates to move said workpiece operator at a rate substantially equal to the rate of motion of said workpiece; and
third means conditioning said workpiece operator for operation during such time as said workpiece operator and said workpiece move at substantially equal rates of motion.

2. Apparatus for operating on a particular portion of a workpiece moving relative to said apparatus comprising
a workpiece operator movable in the direction of motion of said workpiece;
first means operable to impart a continuously variable rate of motion to said workpiece operator;
monitoring means operable to provide a continuously variable signal, said signal variable as a function of the distance of said monitoring means from said particular portion of said workpiece, said monitoring means mounted in a fixed predetermined position relative to said workpiece operator so that said workpiece operator is aligned for operation on said particular portion of said workpiece during operation of said operator;
second means conditioning said first means for operation responsive to and as a function of the signal from said monitoring means so that the rate of motion of said workpiece operator tends to maintain the level of said signal within predetermined limits; and
third means conditioning said workpiece operator for operation during such time as said workpiece operator and said workpiece move at substantially equal rates of motion.

3. Apparatus for operating on a particular portion of a workpiece moving relative to said apparatus comprising
a workpiece operator movable in the direction of motion of said workpiece;
first means operable to impart a continuously variable rate of motion to said workpiece operator;
monitoring means operable to provide a continuously variable signal, the amplitude of said signal variable as a function of the distance of said monitoring means from said particular portion of said workpiece, said monitoring means mounted at a fixed predetermined position relative to said workpiece operator so that said workpiece operator is aligned for operation on said particular portion of said workpiece during operation of said operator;
second means conditioning said first means for operation responsive to and as a function of the amplitude of said signal from said monitoring means so that at signal amplitudes displaced from a predetermined signal amplitude said first means accelerates said workpiece operator tending to stabilize said monitoring means at a distance from said particular portion of said workpiece corresponding to said predetermined signal amplitude; and
third means conditioning said workpiece operator for operation during such time as said monitoring means is so stabilized.

4. The apparatus claimed in claim 3 wherein said monitoring means comprises a photocell continuously responsive to quanta of light incident thereto.

5. The apparatus claimed in claim 4 and means amplifying the signal from said monitoring means to provide damping of the motion of said workpiece operator to motion at a rate substantially equal and parallel to the rate of motion of said workpiece.

6. Apparatus for operating on a particular portion of a workpiece moving relative to said apparatus, comprising
a workpiece operator;
first means supporting said workpiece operator for motion relative to said workpiece;
second means operable to impart a continuously variable rate of motion to said first means parallel to the direction of relative motion of said workpiece;
monitoring means operable to provide a continuously variable signal, said signal variable as a function of the distance of said monitoring means from said particular portion of said workpiece, said monitoring means providing a predetermined level of signal when said monitoring means is at a predetermined distance from said particular portion of said workpiece, said monitoring means mounted at a fixed predetermined position relative to said workpiece operator so that said operator is aligned for operation on said particular portion of said workpiece during operation of said operator;
third means conditioning said second means for operation responsive to the signal from said monitoring means, said rate of motion of said first means being a function of the signal amplitude from said monitoring means, said workpiece operator and said workpiece tending to assume temporarily substantially stationary positions relative to each other at said predetermined level of signal from said monitoring means, and
fourth means conditioning said workpiece operator for operation during such time as such workpiece operator and said workpiece are substantially stationary relative to each other.

7. The apparatus as recited in claim 6 wherein said third means comprises
a servomechanism responsive to the continuously variable signal from said monitoring means tending to damp the motion of said first means such that said workpiece will temorarily assume a substantially stationary position relative to said workpiece operator at a predetermined signal level corresponding to a predetermined distance between monitoring means and said particular portion of said workpiece.

8. Apparatus for operating within closely measured tolerances on a particular portion of a workpiece moving continuously relative to said apparatus, said workpiece having reference means at a fixed predetermined position relative to said particular portion, said apparatus
a workpiece operator;
means for motion substantially parallel to the relative motion of said workpiece and supporting said workpiece operator;
second means operable to impart motion to said operator support means; in a direction substantially parallel to the relative motion of said workpiece;
first monitoring means operable to provide a signal when said workpiece moves past it;
third means responsive to the signal from said first named monitoring means conditioning said second means to impart a constant rate of motion to said operator support means;
second monitoring means operable to provide a continuously variable signal, said signal variable as a function of the distance of said reference means from said second named monitoring means, said second named monitoring means mounted at a fixed predetermined position relative to said workpiece operator so that said operator is aligned for operation on said particular portion of said workpiece during operation of said operator;
fourth means conditioning said second named monitoring means for operation only after the start of operation of said second means;
fifth means responsive to the signal from said second monitoring means conditioning said second means to impart a continuously variable rate of motion to said operator support means, said rate variable as a function of the signal from said second monitoring means to make said workpiece and said workpiece operator temporarily substantially stationary relative to each other at a particular level of signal from second named monitoring means;
sixth means conditioning said workpiece operator for operation during such time as said operator and said workpiece are substantially stationary relative to each other.

9. The apparatus recited in claim 8 wherein there are provided eighth means operatble to return said operator support means to a rest position;
ninth means operable to provide a signal after said workpiece operator has completed an operation; and
tenth means conditioning said eighth means for operation responsive to the signal from said ninth means.

10. Apparatus for operating within closely measured tolerances on a particular portion of a workpiece moving continually relative to said apparatus, comprising
a workpiece operator;
a first carriage for motion relative to said workpiece and substantially parallel to the relative motion of said workpiece;
a second carriage supporting said workpiece operator and mounted upon said first carriage for motion relative to said first carriage and substantially parallel to the relative motion of said first carriage;
first means operable to impart motion to said first carriage in the direction of motion of said workpiece;
second means operable to impart motion to said second carriage relative to said first carriage;
first monitoring means operable to provide a signal when said workpiece moves past it;
third means conditioning said first means for operation responsive to the signal from said first monitoring means;
second monitoring means operable to provide a continuously varying signal, said signal varying as a function of the distance of said particular portion of said workpiece from said second named monitoring means, said second named monitoring means mounted at a fixed predetermined position relative to said workpiece operator;
fourth means conditioning said second named monitoring means for operation after the start of operation of said first means;
fifth means conditioning said second means for operation responsive to and as a function of the signal from said second named monitoring means to make said workpiece and said workpiece operator temporarily assume substantially stationary positions relative to each other at a predetermined level of signal from said second named monitoring means;
sixth means conditioning said workpiece operator for operation during such time as said operator and said workpiece are in said temporarily substantially stationary relation;
seventh means operable to provide a signal after said workpiece operator has completed an operation; and
eighth means operable to impart motion to said first carriage opposite to the direction of said workpiece;
ninth means conditioning said eighth means for operation responsive to the signal from said seventh means.

11. The apparatus claimed in claim 10 wherein said second named monitoring means comprises a photocell continuously responsive to quanta of light incident thereto.

12. The apparatus claimed in claim 11 wherein said third means comprises a combination of resistive and reactive circuit components for constraining a delay between electrical signal applied thereto and electrical signal obtained therefrom.

13. The apparatus cliamed in claim 11 wherein said first named monitoring means comprises a photocell conditioned for bistable response to quanta of light incident thereto.

14. A method of operating on a particular portion of a workpiece continually moving relative to apparatus mounting a movable workpiece operator, comprising
(a) monitoring the position of the particular portion of the moving workpiece relative to said apparatus;

(b) providing a signal variable continuously as a function of the distance of said particular portion of said workpiece from means for monitoring the position of said particular portion of said workpiece;

(c) driving said workpiece operator at substantially a constant velocity when said signal corresponds to a preselected value for said distance;

(d) accelerating said workpiece operator responsive to said signal in a direction tending to reduce said distance to said preselected value when said distance does not equal said preselected value; and (e) conditioning said workpiece operator for operation during such time as said workpiece operator and said workpiece are moving at substantially equal rates of motion, said workpiece operator mounted at a fixed predetermined distance from said means for monitoring the position of said particular portion of said workpiece.

15. The method of claim 14 wherein prior to step (c) there is undertaken the further step of driving said workpiece operator substantially at a speed and in the direction of motion of said workpiece by means of substantially constant rate drive means.

16. The method of claim 14 including the further step of returning said workpiece operator to its initial starting position relative to said apparatus upon completing operation on said particular portion of said workpiece.

17. The method of claim 15 including the further step of returning said workpiece operator to its initial starting position relative to said apparatus upon completing operation on said particular portion of said workpiece.

18. In apparatus for operating on a continually moving strip within close tolerances of predetermined lengths of the strips;
a first carriage;
a second carriage slidably mounted on said first carriage;
a strip operator member secured to said second carriage;
a first monitoring means mounted on said second carriage;
a second monitoring means spaced from said first monitoring means and mounted on said second carriage;
first means operable to impart motion to said first carriage in a path parallel to the motion of said continually moving strip;
second means operable to impart motion to said second carriage in a path parallel to the motion of said first carriage;
said first motion imparting means responsive to said first monitoring means;
said second motion imparting means responsive to said second monitoring means;
said second monitoring means responsive to said first monitoring means;
said first monitoring means having two stable responses conditioned by the position of said continuously moving strip with respect thereto;
said second monitoring means continuously responsive to the relative position thereto of said continually moving strip;
means responsive to said second monitoring means for returning said first and second carriages to initial rest positions;
and means conditioning said strip operator member for operation responsive to said second monitoring means.

19. The apparatus claimed in claim 18 wherein said first monitoring means comprises a photocell conditioned for bistable response to quanta of light incident thereto and said second monitoring means comprising a photocell continuously repsonsive to quanta of light incident thereto.

20. The apparatus claimed in claim 19 wherein said photocells in said first and second monitoring means respond with a change of conductance in the order of magnitude of 10 to 1 within a time range from 1 to 3 milliseconds.

21. The apparatus claimed in claim 18 and means amplifying the signal from said first monitoring means, said amplifying means comprising in its output stage a solid state bistable means.

22. The apparatus claimed in claim 18 wherein said second monitoring means comprises a photocell having a conductance to light incidence response being a curve with a substantially linear portion and said means responsive to said photocell biased for operation at a point on said substantially linear portion.

23. In apparatus for operating on a continually moving strip into predetermined lengths;
a strip operator member;
means mounting said operator member;
means imparting motion to said mounting means;
a source of light on one side of the path of said continually moving strip;
a photoelectric cell operable to provide a signal in response to reception of quanta of light from said source and being on a side of said continually moving strip opposite to the aforementioned side;
means amplifying said signal;
bistable switching means responsive to the amplified signal;
said motion imparting means operable to accelerate said mounting means in a direction of the velocity of the strip responsive to the condition of said switching means;
circuit delay means responsive to said switching means;
a second photoelectric cell responsive to the reception of quanta of light of said source and being on the aforementioned opposite side of said continually moving strip and being at a distance from said first mentioned photoelectric cell, said second mentioned photoelectric cell having a linear portion of electrical signal to quanta of light reception characteristic;
second means amplifying the signal from said second mentioned photoelectric cell;
second bistable switching means responsive to the amplified signal from said second amplifying means and said delay means;
acceleration means operable to impart an additional acceleration to said operator member responsive to the condition of the second mentioned bistable switching means;
a second circuit delay means responsive to a signal from said second switching means;
said operator member operable on said strip in response to a signal from said second delay means;
means operable to reverse acceleration of said mounting means and said additional acceleration means and subsequently bring said mounting means to a rest position responsive to a signal from said second delay means.

24. The apparatus claimed in claim 23 and means conditioning said acceleration means for operation in response to the conditioning of said second mentioned bistable switch, and said first mentioned and second mentioned photoelectric cells being calibrated through a predetermined coefficient of the velocity of the continually moving strip.

25. The apparatus claimed in claim 23 wherein said second photoelectric cell is biased with respect to said source of light so that the electrical responses therefrom are at a voltage on the substanitally linear portion of its characteristic and its electrical response to quanta of light from said source unblocked by said strip is at a voltage within said substantially linear characteristic but below the part of said characteristic previous to approaching the asymptotic value of said characteristic.

26. The apparatus claimed in claim 23 wherein said photoelectric cells and said amplifying means and said bistable switches have a collective response time having an order of magnitude of less than 10 milliseconds.

27. The apparatus claimed in claim 23 wherein the time of operation of said apparatus from the reception of quanta of light of said photoelectric cell to the acceleration of said mounting means is less than the product of the predetermined length to be cut from said strip and the reciprocal velocity of said strip.

28. The apparatus claimed in claim 23 wherein said second photoelectric cell is mounted on said mounting means.

References Cited

UNITED STATES PATENTS 3,226,555  12/1965  Miller _____ 250—219

WALTER STOLWEIN, Primary Examiner

MARTIN ABRAMSON, Assistant Examiner

U.S. Cl. X.R.

250—221, 223, 231